United States Patent [19]

Flynn et al.

[11] Patent Number: 4,564,455

[45] Date of Patent: * Jan. 14, 1986

[54] THREE COMPONENT RESIN SYSTEM AND METHOD FOR PURIFYING AQUEOUS SOLUTIONS

[75] Inventors: George C. Flynn, Chester; Eli Salem, Deal, both of N.J.; Robert Kunin, Yardley, Pa.

[73] Assignee: The Graver Company, Union, N.J.

[*] Notice: The portion of the term of this patent subsequent to Oct. 15, 2002 has been disclaimed.

[21] Appl. No.: 560,806

[22] Filed: Dec. 13, 1983

[51] Int. Cl.⁴ ............................................... C02F 1/42
[52] U.S. Cl. ....................................... 210/675; 210/686
[58] Field of Search ............... 210/670, 681, 685, 686, 210/675, 269, 275, 290, 503; 521/26

[56] References Cited

U.S. PATENT DOCUMENTS

3,475,330 10/1969 Gilles ................................... 210/681
3,527,718 9/1970 Coburn ................................ 210/686
3,582,504 6/1971 Salem et al. ........................ 210/686
3,719,591 3/1973 Crits ................................... 210/686
3,826,761 7/1974 Short ................................... 210/686
3,985,648 10/1976 Casolo ................................. 210/686

Primary Examiner—Ivars Cintins
Attorney, Agent, or Firm—Dressler, Goldsmith, Shore, Sutker & Milnamow, Ltd.

[57] ABSTRACT

The present invention relates to a method for purifying aqueous solutions or condensate in a three component resin system comprising a mixed bed of a strongly basic anion exchange resin, a strongly acidic cation exchange resin and a weakly acidic cation exchange resin. According to the present method, aqueous solutions can be treated to remove metal ions and corrosion products along with ammonia and other volatile amines so that metal ion leakage is substantially reduced and the run length of the resin system is increased. A method for separating and isolating the resins of the three component system is also described.

18 Claims, 9 Drawing Figures

THREE COMPONENT RESIN SYSTEM AND METHOD FOR PURIFYING AQUEOUS SOLUTIONS

TECHNICAL FIELD

The present invention relates to a three component resin system comprising a bed of filter materials including a first layer of a weakly acidic cation exchange resin and a second layer of a mixture comprising a strongly acidic cation exchange resin and an anion exchange resin. Aqueous solutions can be treated in a single vessel containing the three component resin system to remove metal ions and corrosion products along with ammonia and other volatile amines so that metal ion and ammonia leakage is substantially reduced and the run length of the bed is increased. A method for separating and isolating the resins of the three component system is also described.

BACKGROUND OF THE INVENTION

Mixed bed systems containing anion and cation exchange resins for the purification of aqueous solutions have many industrial applications. One application of such a system is in the purification of water for condensate recirculation systems used to drive steam turbines. It is essential that the water be of an extremely high purity level to avoid any adverse effects on the surfaces of blades, boilers and pipes of the turbine. This high purity level is particularly important for secondary condensate treatment in pressurized water reactor (PWR) systems of nuclear power plants.

Since it is desired to produce water that is free of any residue upon evaporation, the cation exchange resin should be in the hydrogen or ammonium form, and the anion exchange resin should be in the hydroxide form. In any event, it is conventional (as described in U.S. Pat. No. 3,582,504 which issued on June 1, 1971 to the assignee of this application and which is incorporated herein by reference) to regenerate a cation exchange resin with a strong acid such as sulfuric or hydrochloric acid, and to regenerate an anion exchange resin with a strong base, generally sodium hydroxide.

A particular problem with mixed bed ion exchange systems of the type conventionally employed is the production of ion "leakage," such as sodium ion leakage from a cation exchange resin or chloride ion leakage from an anion exchange resin. The term "leakage" refers to any ions that are not removed from the water by the ion exchange resin and, thus are permitted to "leak" past the resin. As used herein, the term "leakage" also refers to any undesired ions, such as sodium, which are introduced into the water by the resin itself.

The leakage problem arises primarily from the difficulty of obtaining perfect separation of anion and cation resins in a mixed bed before regeneration of the resins or from incomplete removal of residual undesired ions during a previous regeneration step. As used herein, the term "separation" refers to the bulk classification of resins within a single vessel or zone. The term "isolation" refers to the transfer of resins so that each resin occupies a separate zone.

As is familiar to those skilled in the art, separation is usually accomplished by passing water upwardly through the resins. This stream of water stratifies the resins by carrying the less dense anion exchange resin to the top of a separation vessel, while the more dense cation exchange resin is allowed to sink to the bottom of the vessel.

While the above method is effective for separating the major portion of the resins, perfect separation cannot be achieved. A primary source of this difficulty is the resin fines produced during handling of the resins. Since upflow separation depends upon particle size along with density, the cation exchange resin fines will not sink to the bottom of the separation vessel, but will be carried upwardly with the anion exchange resin. When the resins are subsequently isolated from one another, and the anion exchange resin is regenerated with sodium hydroxide, sodium ions will be introduced into the ion exchange sites of the cation resin contaminant. Thus, when the resins are returned to the service column, sodium ions will be introduced into the water being treated, producing sodium leakage.

This leakage problem is aggravated when ammonium hydroxide is introduced into the stream of the aqueous solution being treated, as is often done in condensate polishing systems to prevent corrosion. The ammonium ions promote the release of excess sodium ions from the cation exchange resin by gradually converting the resin to the ammonium form.

Moreover, ammonia and other volatile amines can be added in trace amounts to the steam of a high pressure boiler or turbine system to help minimize corrosion. The amines often appear in the condensate, however, and reduce the capacity of the resins to remove corrosion products and traces of electrolytes produced by leakage from the condenser.

A separate bed of a strongly acidic cation exchange resin can be placed in line and in front of the mixed bed of anion and cation exchange resins to pretreat the condensate and to remove the ammonia and volatile amines before passage through the mixed bed thereby reserving the capacity of the mixed bed resins to remove leakage and corrosion products. The use of a separate or single bed of strongly acidic cation exchange resin, however, requires the use of separate service vessels and regeneration equipment along with a large excess of fresh or unused acid to regenerate the resin.

The present invention overcomes these disadvantages through the use of a bed of filter materials including a first layer of a weakly acidic cation exchange resin as an active interface that removes impurities including metal ions and ammonia from a solution. A second layer includes a mixture of strongly acidic cation exchange resin and an anion exchange resin. That assembly, as described herein, is a tri-media or three component resin system for treating condensate.

Such a treatment system permits the use of a mixture of a strongly acidic cation exchange resin and a strongly basic anion exchange resin in the second layer with substantially no interference in the operation of the bed from ammonia and volatile amines present in the solution being treated. In effect, the weakly acidic cation exchange resin of the first layer functions to pretreat the solution before the solution is passed through the second layer. Moreover, the process occurs in a single vessel which provides a substantial cost benefit.

The weakly acidic anion exchange resin in the first layer also enhances the operating efficiency of the system by extending the run length of the mixed bed or mixture of the second layer. Runs can be terminated when the ammonia "breaks", that is, when the ammonia concentration in the aqueous solution or condensate exhausts the acidic cation exchange sites of the weakly acidic cation exchange resin. This is also referred to as the "ammonia breakthrough point". In preferred practice, however, the run can be terminated after the ammonia breakthrough point of the weakly acidic cation exchange resin of the first layer is reached, but before the ammonia breakthrough point of the second layer is reached.

As disclosed herein in the operation of the system the ammonia breakthrough point occurs before the sodium breakthrough point. Thus, the weakly acidic cation exchange resin of the first layer will continue to remove sodium and other metal ions from a solution even after the ammonia breakthrough point for that resin has been reached. Moreover, in certain applications it may be desirable to continue to use the tri-media bed even after the ammonia breakthrough points of the resins in the first and second layers have been reached. In such case, ammonia would pass through both layers of the bed and only metal ions would be removed from the solution.

In addition, in the absence of significant amounts of dissolved salts or air, the three component or tri-media resin bed of the system can be removed from service, physically cleaned and the weakly and strongly acidic cation exchange resins individually regenerated with a relatively low quantity of a strong acid. Further, ammonia can be stripped from the cation exchange resins and mixed bed polishing can be effected in a single vessel thereby providing a substantial cost benefit.

Another benefit of the present method is that a tri-media system provides a service bed includes only active components. Thus, the need for an inert media to act as a buffer zone to separate the strongly acidic cation exchange resin and the strongly basic anion exchange resin is eliminated. Surprisingly, the weakly acidic cation exchange resins described herein increase the efficiency of the bed for removing contaminants and facilitate the isolation of the strongly basic anion and strongly acidic cation exchange resins by providing an active interface resin buffer between those resins after the three resins of the system are separated. As a result, contamination of the strongly acidic cation exchange resin by the strongly basic anion exchange resin, and vice versa, is substantially reduced.

In addition, although weakly acidic cation exchange resins have been previously used for mixed bed operations, such resins have only been used in processes which are run at low flow rates with solutions having relatively high concentrations of solids; for example, in the production of liquid sugar. Weakly acidic cation exchange resins have not been used in the treatment of condensate, particularly in processes that are run at high flow rates and low solids concentrations.

SUMMARY OF THE INVENTION

The present invention relates to a three component resin system comprising a bed of filter materials including a first layer of a weakly acidic cation exchange resin and a second layer of a mixture comprising a strongly acidic cation exchange resin and an anion exchange resin. Aqueous solutions can be treated in a single vessel containing the three component resin system to remove metal ions and corrosion products along with ammonia and other volatile amines so that metal ion and ammonia leakage is substantially reduced and the run length of the bed is increased. A method for separating and isolating the resins of the three component system is also described. Virtually complete isolation of the anion exchange resin from any contaminant strongly acidic or weakly acidic cation exchange resin is accomplished, thus substantially reducing ion leakage.

As used herein, the term "tri-media resin bed" refers to a bed having a first layer of a weakly acidic cation exchange resin and a second layer of a mixture of an anion exchange resin and a strongly acidic cation exchange resin. In a preferred embodiment, the first layer is positioned above the second layer in the same vessel. Moreover, the anion exchange resin is preferably in the strongly basic form and is so described herein, but relatively weakly basic anion exchange resin can also be used. A weakly acidic cation exchange resin of the present invention has a density less than that of a typical strongly acidic cation exchange resin but greater than that of a typical strongly basic anion exchange resin.

As used herein, the term "weakly acidic cation exchange resin" refers to an ion exchange resin having an apparent dissociation constant or ionization constant ($pK_a$) from about 3.5 to about 5.8 as measured by conventional methods. [See, for example, Fisher et al., *J. Phys. Chem.*, 60, 1030 (1956)]. Suitable weakly acidic cation exchange resins will be described herein.

The term "strongly acidic cation exchange resin" refers to an ion exchange resin having a $pK_a$ of less than the $pK_a$ of the weakly acidic cation exchange resin that is used in a specific tri-media system. The term "strongly basic anion exchange resin" refers to an ion exchange resin that is preferably in the hydroxide form.

It is well known that strongly acidic cation exchange resins can effectively remove ammonia from water at both high and low ammonia concentrations. Moreover, weakly acidic cation exchange resins have been used for removing ammonia from various solutions with ammonia concentrations in excess of hundreds and thousands parts per million (ppm). However, there is no indication in the prior art that weakly acidic cation exchange resins are capable of effectively removing ammonia or volatile amines from the highly pure condensates such as those encountered in the industrial power applications.

In addition, while it would be advantageous to use weakly acidic cation exchange resins whenever possible because of their excellent regeneration efficiencies, the prior art indicates that such cation exchange resins would not be effective at removing ammonia from condensates, particularly at elevated temperatures. For that matter, the same prior art would suggest that it would be difficult to use a weakly acidic cation exchange resin to remove traces of other cations such as sodium under these same operating conditions.

On pages 36–37 of *Ion Exchange Resins*, written by one of the present inventors, Robert Kunin, titration curves are used to illustrate that the effective capacity of a strongly acidic cation exchange resin is essentially unchanged with variations in ionic strength or metal ion concentration. However, that is not the case for a weakly acidic cation exchange resin. Although the data illustrate the effect on such monovalent ions as sodium and potassium ions, the effect on the ammonium ion would even be more dramatic since the binding of a weak base such as ammonia to a weak acid is less strong than that of a strong base to a weak acid. Moreover, since the basic strength of ammonia or any volatile amine decreases with increasing temperature, the effectiveness of a weakly acidic cation exchange resin for removing ammonia would correspondingly decrease.

The effect of concentration on the removal of ammonia at low concentrations is further illustrated in the commercial literature [Engineer's Manual, Rohm & Haas Co. (1977)]. Here again, according to the information presented on page 32A-2 of that reference, one would conclude that the capacity for ammonia would be negligible at concentrations below 100 ppm.

In essence, one could infer from the prior art that carboxylic or weakly acidic cation exchange resins would be effective primarily for hardness alkalinity. Further, one would also anticipate that monovalent cations such as sodium ions would only be effectively removed by such cation exchange resins in alkaline media having at least modest cation concentrations (greater than 100 ppm).

In reviewing the prior art, it is most important to appreciate the fact that strongly acidic cation exchange resins have been effectively used for removing ammonia and volatile amines from condensates. However, the regeneration efficiencies of such resins are generally poor, and unless the resin is regenerated completely with copious quantities of acid, excessive sodium leakage will occur.

From an efficiency standpoint, one skilled in the art might consider using a weakly acidic cation exchange resin; however, the prior art indicates that such resins do not perform well under condensate polishing conditions. In support of this point, it should be noted that both strongly and weakly acidic cation exchange resins have been commercially available for years; however, weakly acidic cation exchange resins have not been used for condensate polishing even though the need for such an efficient resin has long existed.

In carrying out the separation and isolation process in accordance with the invention, a tri-media resin bed of a condensate treatment system as discussed above is first separated in a conventional manner by passing a fluid upwardly through the exhausted resin bed. As is familiar to those skilled in the art, such separation is most often accomplished by passing a stream of water upwardly through the ion exchange resins in a first separation zone. A separation zone can be a service column or service vessel.

This stream of water stratifies the mixture of the ion exchange resins in the tri-media resin bed to position the less dense strongly basic anion exchange resin in the uppermost layer, the strongly acidic cation resin in the lowermost layer, and the weakly acidic resin in an intermediate layer below that of the strongly basic anion resin layer and above that of the strongly acidic cation resin layer.

The layers are then isolated from one another, so that the anion exchange resin occupies an anion resin zone in a second separation zone, and the weakly acidic and strongly acidic cation exchange resins form a bulk cation resin zone in the first separation zone. In that first separation zone, the weakly acidic cation exchange resin layer forms an upper layer and the strongly acidic cation exchange resin forms a lower layer.

As is well known in the art, complete separation of the resins cannot be achieved during the isolation step. That is because a sharp interface is not formed between the anion exchange resin layer and the weakly acidic cation exchange resin layer. Thus, when the anion exchange resin layer is isolated for regeneration, weakly and strongly acidic cation exchange resin fines can contaminate the isolated anion exchange resin zone. This contaminant cation exchange resin is referred to hereinafter by the terms "resin heel" or "cation heel" which are used interchangeably.

A regenerant "intermediate-density liquid" is then delivered to the isolated anion exchange resin zone. This intermediate-density liquid has a density between the densities of the anion exchange resin and the cation heel, i.e., greater than the density of the anion exchange resin and less than that of the contaminant weakly and strongly acidic cation exchange resins. The intermediate density liquid is delivered to the anion exchange resin in an amount sufficient to cause the anion resin to float and the cation heel to sink. The regenerant intermediate-density liquid is preferably a concentrated aqueous solution of sodium hydroxide. Thus, when the anion exchange resin is regenerated with sodium hydroxide, sodium ions will be introduced into the ion exchange sites of the weakly or strongly acidic cation resin heel contaminant.

Because no overflow is involved in the regeneration process, the cation heel in the sodium form is readily separated from the anion exchange resin. The thus separated anion exchange resin is then isolated as regenerated anion exchange resin from the contaminant cation heel and is transferred to a resin storage vessel. The cation heel is purge rinsed of sodium hyroxide in a conventional manner and occupies the second separation zone.

The layers in the first separation zone are then isolated from one another, so that the weakly acidic cation exchange resin occupies the second separation zone together with the rinsed cation heel, and the strongly acidic cation exchange resin occupies the first separation zone. The cation exchange resins are regenerated in series by passing an aqueous solution of a strong acid in a conventional manner through the first separation zone and then passing this "waste" acid through the second separation zone. Thus, at the end of this step, the regenerated strongly acidic cation exchange resin occupies the first separation zone and regenerated weakly acidic cation exchange resin occupies the second separation zone at the end.

During the regeneration step, any ammonia which is absorbed on the major portion of the weakly acidic cation exchange resin in the second separation zone and any sodium ion adsorbed on the cation heel is stripped by the "waste acid" which has passed through the strongly acidic cation exchange resin in the first separation zone.

The regenerated strongly acidic cation exchange resin is subsequently transferred to the resin storage vessel containing the regenerated anion exchange resin to form a mixed resin bed that is ready to be placed back in service.

A tri-media resin bed for condensate treatment can be formed by transferring the mixed resin bed from the resin storage vessel to a service column, and transferring the regenerated weakly acidic cation exchange resin to the mixed resin bed. During the regeneration of the exhausted resins, the weakly acidic cation exchange resin provides an active interface resin zone that serves as a buffer between the strongly acidic cation exchange resin and the anion exchange resin, much in the same manner that "inert" resin systems are employed. As a result, contamination of the strongly acidic cation exchange resin by the strongly basic anion exchange resin, and vice versa, is substantially reduced.

Still further benefits and advantages of the present invention will become apparent to those skilled in the art from the detailed description of the invention, the examples and the claims which follow.

DETAILED DESCRIPTION OF THE INVENTION

The Use of a First Layer of a Weakly Acidic Cation Exchange Resin in a Tri-Media System to Remove Impurities Including Metal Ions and Ammonia According to the present invention, a three component or tri-media resin system includes a first layer of a weakly acidic cation exchange and a second layer comprising an anion exchange resin and a strongly acidic cation exchange resin. The bed which is formed in a single vessel removes ammonia and other volatile amines along with corrosion products and metal ion leakage, and the resin of the first layer can be completely regenerated with only a slight excess of acid.

Strongly acidic cation exchange resins such as sulfonated styrene-divinylbenzene copolymer products, on the other hand, require a relatively large excess of acid for regeneration and, unless completely regenerated, such resins are prone to metal ion leakage and, in particular, sodium leakage.

As discussed above, weakly acidic cation exchange resins exhibit poor small particle ion exchange kinetics whereas condensate polishing requires good ion exchange kinetics. In fact, the prior art does not even suggest the use of weakly acidic cation exchange resins for condensate polishing or under condensate polishing conditions; i.e., high flow rates (25-75 gpm/ft$^2$) and low concentrations of total dissolved solids (TDS).

It is well known that strongly acidic cation exchange resins can effectively remove ammonia from water at both high and low concentrations. Moreover, weakly acidic cation exchange resins have been used to remove ammonia from various solutions having ammonia concentrations in excess of hundreds and thousands parts per million (ppm). However, there is little, if any, indication in the prior art that weakly acidic cation exchange resins are capable of effectively removing ammonia or volative amines from the condensates of high purity condensates such as those encountered in the industrial power applications.

In addition, while it would be advantageous to use weakly acidic cation exchange resins whenever possible because of their excellent regeneration efficiencies, the prior art indicates that such cation exchange resins would not be effective at removing ammonia from condensates, particularly at elevated temperatures. For that matter, the same prior art would suggest that it would be difficult to use a weakly acidic cation exchange resins to remove traces of other cations such as sodium under these same operating conditions.

Moreover, as further discussed above, the effective capacity of a strongly acidic cation exchange resin is essentially unchanged with variations in ionic strength or metal ion concentration. However, that is not the case for a weakly acidic cation exchange resin. Although the data illustrate the effect on such monovalent ions as sodium and potassium ions, the effect on the ammonium ion would even be more dramatic since the binding of a weak base such as ammonia to a weak acid is less strong than that of a strong base to a weak acid. In addition, since the basic strength of ammonia or any volatile amine decreases with increasing temperature, the decrease in effectiveness of a weakly acidic cation exchange resin for removing ammonia should further decrease with temperature.

According to the prior art as discussed above which relates to the effect of concentration on the removal of ammonia at low concentrations, one would conclude that the capacity for ammonia would be negligible at concentrations below 100 ppm.

In essence, one would infer from the prior art that carboxylic or weakly acidic cation exchange resins would be effective primarily for hardness alkalinity. Further, one would also anticipate that monovalent cations such as sodium ions would only be effectively removed by such cation exchange resins in alkaline media having at least modest cation concentrations (greater than 100 ppm).

In reviewing the prior art, it is most important to appreciate the fact that strongly acidic cation exchange resins have been effectively used for removing ammonia and volatile amines from condensates. However, the regeneration efficiencies of such resins are poor and unless the resin is regenerated completely with copious quantities of acid, excessive sodium leakage will occur.

From an efficiency standpoint, one skilled in the art might consider using a weakly acidic cation exchange resin; however, the prior art indicates that such resins do not perform well under condensate polishing conditions. In support of this point, it should be noted that both strongly and weakly acidic cation exchange resins have been commercially available for years; however, weakly acidic cation exchange resins have not been used for condensate polishing even though the need for such an efficient resin has long existed.

In selecting the proper cation exchange resin for removing ammonia and volatile amines from condensates, a cation exchange resin must have an acidity that is sufficiently low to permit regeneration with high efficiency but sufficiently high so as to effectively remove ammonia. The acidity of an ion exchange resin is usually expressed in terms of its $pK_a$ value; i.e. the negative logarithm of the ionization constant, $K_a$, of the cation exchange resin and can be expressed as follows:

$$pK_a = -\log K_a$$

The ionization constant $K_a$ is a measure of the degree of ionization of the acid form of the cation exchange resin. The greater the value of the ionization constant, the greater is the acid strength. Of course, as the ionization constant increases, the $pK_a$ will decrease. Hence, in terms of $pK_a$, a cation exchange resin with as high a $pK_a$ as possible should be used provided the resin is still able to remove ammonia and volatile amines at elevated temperatures as high as 140°-150° F.

If only carboxylic acid-type weakly acidic cation exchange resins are considered, the $pK_a$ of the weakly acidic cation exchange resin should be less than a value of about 5.8. A non-halogenated derivative of a carboxylic acid-type weakly acidic cation exchange resin usually exhibits a $pK_a$ greater than about 5.0. A halogenated derivative of a carboxylic acid-type weakly acidic cation exchange resin, on the other hand, exhibit $pK_a$ greater than about 4.0. If the $pK_a$ of the resin is significantly greater than about 5.8, the process will not operate efficiently.

If weakly acidic cation exchange resins such as phosphonic and phosphonous acid resins are considered, the lower end of the $pK_a$ range would be 3.5. Below that value, regeneration efficiency of the resin is poor. As a result, the weakly acidic cation exchange resin of the present invention should have a $pK_a$ from about 3.5 to about 5.8.

In addition, temperature plays a significant role in the method of the present invention. As the temperature is increased, the overall operating capacity of the resin is decreased but the utilization of the equilibrium capacity is increased. These data can be used to ascertain the temperature above which use of the present method would be impractical. From the following examples, it can be seen that the present method can be operated efficiently at temperatures as high as 200° F. In preferred practice, the present method is performed at a temperature in the range of about 115°–140° F.

The following examples are intended to illustrate the use of a weakly acidic cation exchange resin in the present invention, and should not be construed as limiting since the scope of the invention is determined with reference to the appended claims.

EXAMPLE 1 (Runs 1–4)

Three weakly acidic cation exchange resins and one strongly acidic cation exchange resin were evaluated for ammonia removal capacity under typical condensate polishing conditions; specifically, at a relatively high flow rate, low inlet concentration of impurities and elevated temperature.

The three weakly acidic resins evaluated in this example were DUOLITE C-464 macroporous (Diamond Shamrock Chemical Co., Cleveland, Ohio), AMBERLITE IRC-84 gel (Rohm and Haas Co., Philadelphia, Pa.) and DOWEX MWC-1 macroporous (Dow Chemical Co., Midland, Mich.), are representative acrylic acid-divinylbenzene type cation exchange resins having $pK_a$s less than about 5.8. These resins were selected on the basis of excellent osmotic shock resistance and high capacity. Additional weakly acidic cation exchange resins that are suitable for use in the present invention include Lewatit CNP (Bayer, West Germany) and Ionac CC (Ionac Chemical Co., Birmingham, N.J.).

DOWEX HGR W2 (Dow Chemical Co., Midland, Mich.) was selected for comparison purposes as a typical strongly acidic styrene-divinylbenzene type cation exchange resin having sulfonic acid active groups. Other suitable strongly acidic cation exchange resins include Dowex HGR-S (Dow Chemical Co., Midland, Mich.), Amberlite IR-120 (Rohm and Haas Co., Philadelphia, Pa.) and Ionac C-267 (Ionac Chemical Co., Birmingham, N.J.).

Columns having an internal diameter of 1.5 inches were each filled with a resin to an 18 inch bed height as a preliminary test of the efficiency of each resin. Single element pilot plant feed tanks and pumps were used to feed ammonia at a rate of 2 parts per million (ppm) in a solution maintained at a pH of 9.6 and a temperature of 80°–140° F. Ammonia influent and effluent conductivity were continuously monitored by conventional methods using a conductivity recorder. Flow meters and needle valves were used to monitor and control the flow rate through each column. This technique for controlling the flow rate was sometimes less than satisfactory since flow tended to drop off during the runs as the pressure increased. In general, however, flow conditions were approximately 0.4 gallons per minute (gpm), 33 gpm/ft$^2$ and 21 gpm/ft$^3$. (See Table 1).

Dilute sulfuric acid (4–5% by weight) was used to regenerate each resin at a dosage approximately equal to four times (4x) the stoichiometric amount necessary for complete regeneration of the resin, except in three tests as shown in Table 1 in which 1.2x the stoichiometric amount was tested. Regeneration was done manually, using a separatory funnel to gravity feed the regenerant for a contact time of at least one hour. Each resin was rinsed at 1 gpm/ft$^2$, and the effluent was monitored using a Beckman conductivity bridge and a flow-through cell.

Capacities were calculated from run length, influent ammonia and effluent ammonia as determined by conductivity measurements. Calculated equilibrium capacities were verified where possible by determining the mass balance on spent regenerant using ammonia electrode and back titration techniques.

TABLE 1

| Run No. | Resin[1.] | Cycle No. | Regen. Level (Percent) | Operating Temp. (°F.) |
|---|---|---|---|---|
| 1 | Dowex HGR W2 | 1 | 400 | 80 |
|   | Duolite C-464 | 1 | 400 | 80 |
| 2 | Dowex HGR W2 | 2 | 120 | 90 |
|   | Amberlite IRC-84 | 1 | 400 | 90 |
| 3 | Amberlite IRC-84 | 2 | 120 | 95 |
|   | Dowex MWC-1 | 1 | 400 | 95 |
| 4 | Dowex MWC-1 | 2 | 120 | 140 |
|   | Amberlite IRC-84 | 3 | 400 | 140 |

[1.]Resins were subjected to one exhaustion/regeneration cycle prior to testing, except for Doulite C-464 which was not precycled. Each resin was used as received from the manufacturer with no screening or backwashing.

Table 2 lists the results obtained for ammonia removal with the cation exchange resins under the foregoing conditions of low inlet concentration, relatively high flow rate and elevated temperature. The exchange capacity, pressure drop ($\Delta P$) and run length were determined for each resin.

Under the column in Table 2 entitled "Run Length", the subheading "Break" refers to the breakthrough point which is the time (usually expressed in hours) during operation of the bed at which some of the material to be adsorbed by the resin passes through the entire depth of the bed without being adsorbed and appears in the effluent. After the breakthrough point, the effluent concentration of the material to be adsorbed by the resin increases with time until it equals the concentration of that material at the inlet of the bed. At this time, the entire bed has a sorbed-phase concentration in equilibrium with the effluent concentration, and the bed is referred to as being exhausted. In a similar manner, under the column entitled, "Capacity", the subheading "Break" refers to the breakthrough ion exchange capacity (equivalents per liter) of the resin tested.

TABLE 2

| Resin | Cycle No. | Temp. (°F.) | Capacity[1](eq/l) Break | Equil. | $\Delta P$ (psi) Initial | Final | Run Length (hrs) Break | Equil |
|---|---|---|---|---|---|---|---|---|
| HGR W2 | 1 | 80 | 1.73 | 1.85 | 4.4 | 4.4 | 74 | 99 |
|  | 2 | 80 | 0.90 | 0.95 | 4.2 | 4.2 | 40 | 50 |
| C-464 | 1 | 80 | 0.92 | 1.33 |  |  | 41 | 66 |
| IRC-84 | 1 | 90 | 1.28 | 1.42 | 6.0 | 14.5 | 48 | 76 |

TABLE 2-continued

| Resin | Cycle No. | Temp. (°F.) | Capacity[1](eq/l) Break | Capacity[1](eq/l) Equil. | Δ P (psi) Initial | Δ P (psi) Final | Run Length (hrs) Break | Run Length (hrs) Equil |
|---|---|---|---|---|---|---|---|---|
| | 2 | 90 | 1.23 | 1.37 | 9.5 | 17 | 48 | 81 |
| | 3 | 140 | 1.46 | 1.59 | | | 45 | 67 |
| MWC-1 | 1 | 90 | 1.48 | 1.60 | 6.5 | 10.5 | 62 | 91 |
| | 2 | 140 | 1.51 | 1.63 | | | 52 | 74 |

[1]Calculated capacities are expressed as equivalents per liter. Several values were verified by mass balance measurements on the spent regenerant.

Good ion exchange capacities were obtained with Amberlite IRC-84 and Dowex MWC-1; 28 and 32 kilograins per cubic foot (kgr/ft$^3$), respectively, to an ammonia breakthrough at 90° F. These capacities represent approximately 30% of the total exchange sites on Amberlite IRC-84 and approximately 38% for Dowex MWC-1. The 38 kgr/ft$^3$ capacity obtained for the strongly acidic cation exchange resin Dowex HGR W2, is approximately 78% of its total available exchange sites.

Duolite C-464, which had a low breakthrough capacity, 20 kgr/ft$^3$ (approximately 36% of the total exchange sites), did not rinse down after regeneration and was eliminated from further testing. High capacities were retained after 120% regeneration of both Amberlite IRC-84 and Dowex MWC-1 and both resins showed reasonable conductivity upon rinse down.

Although Dowex MWC-1 required a greater rinse volume (about 2.5 bed volumes) than Dowex HGR W2 (about 1.7 bed volumes) to effect an effluent conductivity of 100 micromhos, the rinse curve for the two resins were very similar after 6 bed volumes of rinse. For example, the rinse volume requirement to achieve an effluent conductivity less than 10 micromhos was about 7.5 bed volumes for Dowex MWC-1 and about 8.5 bed volumes for Dowex HGR W2.

The high capacities obtained for both resins at 140° F., compared to the capacities obtained at 90° F., may be due either to the lower area flow rate which would mask the temperature effect observed in a later testings or to inaccurately controlled flow rate throughout the preliminary testing.

As expected, Amberlite IRC-84 and Dowex MWC-1 developed a high pressure drop during exhaustion as compared to Dowex HGR W2. After 72 hours of operation, after which approximately 90 percent of each resin was exhausted, the pressure drop for Dowex MWC-1 was 10.5 psi (pounds per square inch) and for Amberlite IRC-84 was 15 psi, which is a change from an initial reading of 6 psi. Dowex HGR W2 remained at 4.5 psi throughout the entire run.

Example 2 (Runs 5-11)

Based on the results of Example 1, Dowex MWC-1 was selected for further testing (see Table 3). A pilot plant, with a 4 inch internal diameter column, was operated under conditions similar to those described in Example 1, but at a bed height of 36 inches and with an increased flow rate: 50 gpm/ft$^2$ (the volumetric flow rate expressed in terms of gpm/ft$^3$ remained the same as in Example 1).

The flow rate was regulated with a control valve and was verified with a flow meter, so that the flow rate remained relatively constant during each run. Sodium removal was evaluated in Runs 10 and 11, with influent and effluent sodium being measured with an Orion SLED analyzer. The effect of temperature was determined over the range of 100° to 140° F.

TABLE 3

| Run No. | Dowex MWC-1 Resin | Cycle No. | Operating Actual Temp. (°F.) | Operating Actual Bed Height (Inches) |
|---|---|---|---|---|
| 5 | screen, backwash | 1 | 140 | 33 |
| 6 | same resin #5 | 2 | 140 | 33 |
| 7 | same resin #6 | 3 | 120 | 33 |
| 8 | as received | 1 | 100 | 36 |
| 9 | same resin run #8 | 2 | 120 | 36 |
| 10 | same resin run #9 | 3 | 140 | 36 |
| 11 | same resin run #10 | 4 | 120 | 36 |
| 12 (mixed bed) | same resin run #11 backwashed | 5 | 90 | 18 and |
| | SBRP, as received | 1 | | 18 |

Table 4 lists the results obtained with Dowex MWC-1 over the temperature range 100 to 140° F. As previously indicated, a higher flow rate (50 gpm/ft$^2$) was used in these runs as compared to the runs of Example 1. Ammonia influent, however, remained the same at 2 ppm and the pH of the ammonia feed solution was 9.6. Sodium removal was also investigated.

Temperature, as expected, had a marked effect on resin performance, affecting equilibrium capacity and thereby run lengths, as well as extent of utilization at the ammonia breakthrough point. Temperature did not appear to directly effect effluent quality. Ammonia concentrations in the effluent during each run ranged from 3 to 11 ppb as $NH_3$, conductivity from 0.07 to 0.14 micromhos (adjusted to 25° C.) and pH between 5 to 6.

TABLE 4

| | (Runs 5-9) DOWEX MWC-1 | | | | |
|---|---|---|---|---|---|
| Run No. | 5 | 6 | 7 | 8 | 9 |
| Temperature (°F.) | 140 | 137 | 120 | 100 | 119 |
| Bed Height (inches) | 33.5 | 32 | 32 | 36 | 36 |
| Influent $NH_3$ (ppm as $NH_3$) | 1.9 | 2.2 | 2.2 | 2.2 | 2.1 |
| Effluent $NH_3$ (ppb) | 6-11 | 7-9 | 3 | 7 | 7 |
| Effluent conductivity (micromhos) | 0.09-0.14 | 0.10-0.12 | 0.055 | 0.10 | 0.10 |
| Effluent pH | 5.6 | — | — | 5.2-5.6 | 4.6-5.7 |
| Run length (hrs) | | | | | |
| to break | 49 | 45 | 58 | 79 | 60 |
| to equil. | 61 | 56 | 70 | 120 | 88 |
| Capacity (eq/l) | | | | | |
| at break | 0.823 | 0.854 | 1.10 | 1.28 | 1.04 |
| at equil. | 0.905 | 0.970 | 1.34 | 1.79 | 1.24 |
| Δ P initial (psi) | 10 | 13 | 15 | 27 | 30 |
| Δ P final[1] (psi) | 21 | 21 | 21 | 41 | 37 |
| exchange zone (inches) | 6.6 | 6.3 | 5.5 | 12.3 | 11.5 |

[1]For the equilibrated resin, the pressure drop (Δ P) was relieved and was then remeasured to compensate for wall effects.

The run lengths of a weakly acidic cation exchange resin (Dowex MWC-1) varied with temperature. Increasing the temperature from 100° F. to 140° F. reduced the run length by about 50 percent. Temperatures higher than 140° F. are not expected under normal operating conditions. However, at temperatures over 140° F. the capacity (and run length) of the resin gradually decreases, and the resin would eventually be thermally regenerated with little or no ammonia capacity.

The effect of temperature on equilibrium capacity, breakthrough capacity and utilization was also examined. As the equilibrium capacity is reduced with increasing temperature, utilization at the breakthrough point is increased due to increased ion exchange kinetics.

In addition, resin bead swelling, upon conversion of Dowex MWC-1 from the hydrogen to the ammonia form, at different temperatures, was investigated. The observed dependence of swelling on temperature was most likely a function of the extent of exhaustion, since equilibrium capacity varied with temperature in the same manner as swelling.

As indicated in Table 5, a substantial quantity of sodium ions were removed from a solution by Dowex MWC-1 under the conditions tested. Influent sodium ion concentrations of 100 ppb (in Run Number 10) at 140° F. and 550 ppb (in Run Number 11) at about 120° F. were reduced to approximately 0.4 ppb and 1 ppb, respectively. In both cases, sodium removal was independent of the ammonia breakthrough point, the sodium breakthrough point occurring well after the ammonia breakthrough point. Table 5 also summarizes the results obtained upon sodium and ammonia loading at the ammonia breakthrough point, the ammonia equilibrium point and the sodium breakthrough point.

TABLE 5

| | (Runs 10-12) | | |
|---|---|---|---|
| Run No. | 10 | 11 | 12 |
| Temperature (°F.) | 140 | 118 | 90 |
| Bed Height (inches) | 36 | 26 | 26 |
| Influent NH$_3$ (ppm NH$_3$) | 2.3 | 2 | 2.0 |
| Influent Na (ppb Na) | 100 | 550 | 50 |
| begun at (hours) | 22 | 8 | 0 |
| Effluent NH$_3$ (ppb) | <10 | <10 | <10 |
| Na (ppb) (±0.1) | 0.4 | 1 | 0.5 |
| Conductivity (micromhos) | 0.12-0.14 | 3.4-4.3 | 0.12 |
| pH | 4.8-5.4 | 5.0-5.9 | Neutral to MO, P |
| Run Length to NH$_3$ break (hrs) | 48 | 70 | 40 |
| to NH$_3$ equil. (hrs) | 67 | 100 | 78 |
| to Na break | >66 | 95 | 60 |
| to Na equil. | >70 | >120 | >120 |
| Loading (eq/l) at NH$_3$ break | | | |
| NH$_3$ | 0.0897 | 0.82 | 1.40 |
| Na | 0.016 | 0.205 | 0.050 est. |
| Total | 0.913 | 1.03 | 1.45 |
| Loading (eq/l) at NH$_3$ equil. | | | |
| NH$_3$ | 1.15 | 0.978 | 2.04 |
| Na | 0.026 | 0.304 | 0.098 |
| Total | 1.18 | 1.28 | 2.14 |
| Loading (eq/l) at Na break | | | |
| NH$_3$ | 1.15 | 0.978 | 2.04 |
| Na | 0.026 | 0.313 | 0.089 |
| Total | 1.18 | 1.55 | 2.13 |
| Loading at end of run | | | |
| NH$_3$ | 1.15 | 0.978 | 2.04 |
| Na | 0.026 | 0.457 | 0.098 |
| Total | 1.18 | 1.44 | 0.098 |
| $K_b$[1] (equilibrium) | not equilibrated | 0.70 | 0.79 |
| Δ P Initial (psi) | 26 | 20 | 5 |
| Δ P Final (psi) | 38 | 54 | 15 |

[1] $K_b = (RNa)(NH_4^+)/(RNH_4)(Na+)$

While the mechanism of sodium removal is not entirely clear, it appears from the data obtained in these runs that prior to the ammonia breakthrough point, sodium is exchanged to the detriment of ammonia removal; i.e., ammonia leakage should be equivalent to the amount of sodium removed.

The data in Table 5 demonstrate that the use under condensate polishing conditions of a weakly acidic cation exchange resin having a pK$_a$ less than about 5.8 effectively removed both sodium ions and ammonia from a condensate solution. In particular, the removal of sodium ions and ammonia was greater than 99% at temperatures from 90° to 140° F.

Example 3 (Run 12)

The performance of a mixed bed system comprising a 1 to 1 volume ratio of Dowex MWC-1 and a strongly basic styrene-divinylbenzene type anion exchange resin having quaternary ammonium active groups [Dowex SBR-P (Dow Chemical Co., Midland, Mich.] was determined. Other suitable strongly basic anion exchange resins of the same type as Dowex SBR-P include Dowex SBR (Dow Chemical Co., Midland, Mich.), Amberlite IRA-400 (Rohm and Haas Co., Philadelphia, Pa.) and Ionac X-220 (Ionac Chemical Co., Birmingham, N.J.).

The mixed bed system was operated under the same conditions and influent ammonia concentrations as those described in Example 2 and was evaluated for ammonia and sodium removal capacity. The weakly acidic cation exchange resin should comprise at least 25 percent (dry weight) of the total bed volume. As in Example 2, the bed height was 36 inches. However, 50 ppb Na feed using a sodium chloride solution was employed.

Sodium leakage was about 0.5 ppb (±0.1) until the sodium breakthrough point was reached at about 60 hours. That was long after the ammonia breakthrough point which occurred at 40 hours. Ammonia leakage during the run was estimated to be 6 ppb or less based on the effluent conductivity. The effluent conductivity at 24° C. was 0.12 micromhos prior to the ammonia breakthrough point with a cation conductivity at 0.06 micromhos and an anion conductivity unchanged at 0.12 micromhos. This indicates that no measurable chloride (anion) leakage took place but that some ammonia leakage occurred.

Thus, mixed bed operation with a weakly acidic cation exchange resin and a strongly basic anion exchange resin resulted in low effluent concentrations of cations, anions and amines (primarily, sodium ions, chloride ions and ammonia, respectively). In particular, the removal of sodium ions and ammonia was greater than 99% at temperatures from 90° to 140° F.

Compared to the single bed operation described in Example 2, the pressure drop was much less with the mixed bed system, due in part to a slight clumping of the mixed resins. An initial pressure drop of 5 psi increased to 15 psi at ammonia equilibrium. Bed expansion appeared minimal, due to a decreased volume of the weakly acidic cation exchange resin volume and to clumping which resulted in a larger void volume. (Dowex SBR-P without "anticlump" was used.)

After equilibrium, the anion and cation exchange resins were still clumped and could not be separated by merely backwashing with water. However, backwashing with an aqueous 10% (by weight) sodium chloride solution resulted in excellent (almost 100%) separation of the two resins.

EXAMPLE 4

One gram of dry ground (100-325 Mesh) Amberlite IRC-50 (Rohm and Haas Co., Philadelphia, Pa.), a methacrylic acid-divinylbenzene type weakly acidic cation exchange resin having an ionization constant ($pK_a$) of about 6.1, was prepared as an aqueous slurry with 1 gram of a dry, powdered strongly basic anion exchange resin in the hydroxide form [Powdex PAO (The Graver Company, Union, N.J.)]. In a preferred embodiment, the weakly acidic cation exchange resin has particle size in the range of about 1 to 150 microns. The slurry was prepared as a precoat filter as described in U.S. Pat. Nos. 3,250,703 and 3,779,386, which are assigned to the assignee of the present application and which are incorporated herein by reference.

Two condensate polishing runs were made at a flow rate of 4 gpm/ft$^2$ (gallons per minute per square foot) and at a temperature of 50° C. (approximately 122° F.) with condensate samples as described in Table 6. The effluent conductivity and thus the concentration of impurities in the effluent were measured after 4 hours by means of conductivity and acid conductivity techniques as previously described (after passage through a well-rinsed column of a strongly acidic type cation exchange resin). The data for these runs are presented in Table 6.

TABLE 6

CONDENSATE POLISHING RUNS WITH A PRECOAT FILTER INCLUDING A WEAKLY ACIDIC CATION EXCHANGE RESIN (pka 6.1)

| RUN NO. | INFLUENT pH | INFLUENT Na (ppb)[1] | INFLUENT NH$_3$ (ppb) | INFLUENT ACID CONDUCTIVITY (micromhos) | EFFLUENT Na (ppb) | EFFLUENT NH$_3$ (ppb) | EFFLUENT ACID CONDUCTIVITY (micromhos) |
|---|---|---|---|---|---|---|---|
| 1 | 9.6 | 400 | 2000 | 5.6 | 10 | 1500 | 0.07 |
| 2 | 9.6 | 100 | 2000 | 1.4 | 1 | 1500 | 0.07 |

[1]Added as an aqueous sodium chloride solution (10% of NaCl by weight).

As indicated in Table 6, the use under condensate polishing conditions of a weakly acidic cation exchange resins having a $pK_a$ of about 6.1, when combined with a strongly basic anion exchange resin to form a precoat filter, effectively removed sodium ions from a condensate solution, but removed only a relatively small amount of ammonia. In particular, the removal of sodium ions was greater than 97%, while only 25% of the influent ammonia was removed.

The Separation and Isolation of the Resins of the Tri-Media Bed

As previously stated, in accordance with a first embodiment of the separation and isolation procedure of the present invention, exhausted anion and cation exchange resins are first separated from a tri-media resin bed of the present inventory in a first separation zone in a conventional manner with an upflow of liquid. This liquid is preferably water.

Thereafter, the anion exchange resin is isolated in a second separation zone and a contaminant weakly acidic cation exchange resin heel is separated from the anion exchange resin by the use of an intermediate-density liquid. This liquid causes the anion exchange resin to float, while permitting any contaminant cation resin heel to sink to the bottom of the tank.

In preferred practice, the intermediate-density liquid is an aqueous solution of an alkali metal hydroxide such as sodium hydroxide, since sodium hydroxide will simultaneously regenerate the anion exchange resin. Such a solution is particularly advantageous in that it regenerates the anion exchange resin at the same time that it separates the anion exchange resin from cation resin contaminants. Because the sodium hydroxide solution will be fairly concentrated (i.e., generally in the range of about 10 to 20 weight percent) a very high level of regeneration will be achieved.

Numerous other intermediate-density liquids can be employed including organic liquids and aqueous solutions of inorganic and organic compounds that have a density intermediate between that of the anion and cation exchange resins. The only essential factor for such a liquid is that it not damage the resin. A particularly suitable aqueous salt solution is a solution of sodium sulfate. Although such a solution converts the anion exchange resin to the sulfate form, sulfate anions are readily removed during the regeneration procedure. An aqueous sodium chloride solution can also be used as the intermediate-density liquid.

A second embodiment of the separation and isolation method of the invention provides a method for separating a weakly acidic cation exchange resin from a strongly acidic cation exchange resin, and isolating one from the other so that acid regenerant can be delivered to each in series. In carrying out the method, an aqueous solution of a strong acid, preferably sulfuric or hydrochloric acid, is delivered downwardly through the strongly acidic cation exchange resin in the first separation zone and then subsequently passing the "waste" acid is passed downwardly through the weakly acidic cation exchange resin in the second separation zone. At the end of the process, regenerated strongly acidic cation exchange resin occupies the first separation zone and regenerated weakly acidic cation resin occupies the second separation zone.

A third embodiment of the separation and isolation method of the invention provides a method for simultaneously regenerating a resin bed comprising a weakly acidic cation exchange resin and a strongly acidic cation exchange resin having sodium and ammonium ions adsorbed thereon in a single separation zone by passing an aqueous solution of a strong acid through the mixed resin bed.

As those skilled in the art will appreciate, a wide variety of tank or column arrangements can be employed to carry out the method of the present invention. Examples of suitable apparatus are described in U.S.

Pat. No. 3,585,127, which issued on June 15, 1971 and which is assigned to the assignee of this application.

Operation of a tri-media resin bed system according to the present invention reduces acid consumption during the regeneration process by a factor of 2-3 and minimizes sodium leakage relative to a mixed bed system utilizing a strongly acidic cation exchange resin and a strongly basic anion exchange resin. Base consumption can also be reduced under certain conditions by omitting the regeneration step of the strongly basic anion exchange resin.

The figures show a diagramatical illustration of a tri-media resin condensate treatment system in a single vessel using a weakly acidic cation exchange resin as a first layer preferably above a second layer of a mixture of an anion exchange resin and a strongly acidic cation exchange resin. For purposes of illustration, the drawings are in flow sheet form, it being understood that connection between the various columns or tanks can be obtained with suitable piping.

Each of the tanks defines a suitable vessel for the treatment of exhausted ion exchange resin mixtures for separation, regeneration and re-mixture. In the embodiment shown, there is a service vessel 10, hereinafter sometimes referred to as S.V.1; a cation exchange resin vessel 11, hereinafter referred to as C.R.; an anion exchange resin/weak acid cation exchange resin regeneration (A.R./W.A.R.) vessel 12; and a resin storage (R.S.) vessel 13.

Figure 1:
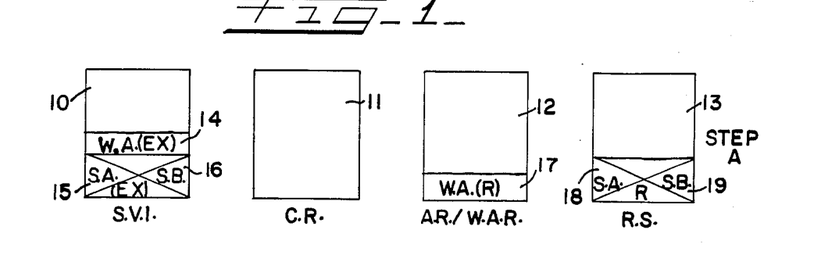
FIGS. 1-9 are diagramatic flow charts illustrating the sequential steps of a preferred embodiment of the present invention.

FIG. 1 shows the initial step A wherein the service vessel (S.V.1) contains a mixed bed of completely or partially exhausted tri-media resin bed from a condensate treatment system comprising a layer of exhausted weakly acidic cation exchange resin [W.A.(ex)] indicated by the reference numeral 14, positioned above a mixture of a strongly acidic cation exchange resin [S.A.(ex)] indicated by reference 15 and a strongly basic anion exchange resin [S.B.(ex)] indicated by the reference numeral 16.

At this point, the C. R. vessel 11 is empty and is available to receive the exhausted resins 14, 15 and 16 from S.V.1 10. The anion exchange resin/weakly acidic cation exchange resin regeneration (A.R./W.A.R.) vessel 12 contains one charge of a weakly acidic cation exchange resin in the regenerated form as indicated by numeral 17 as W.A.(R). The resin storage (R.S.) vessel 13 contains one charge each of a strongly acidic cation exchange resin and a strongly basic anion exchange resin as indicated respectively by the reference numeral 18 as S.A.(R) and the reference numeral 19 as S.B.(R), regenerated and re-mixed.

Figure 2:
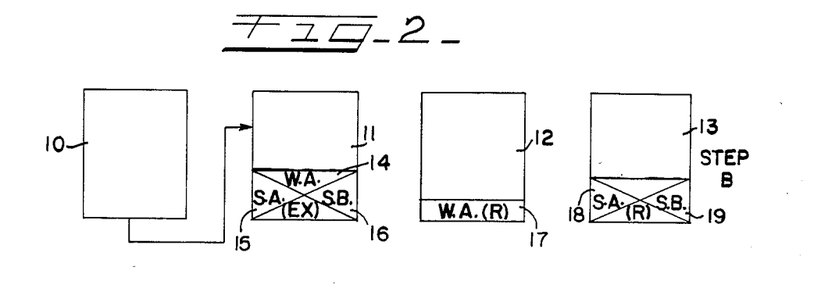
Figure 3:
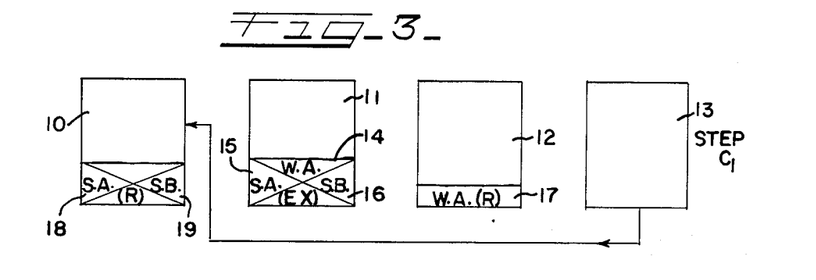
Figure 4:
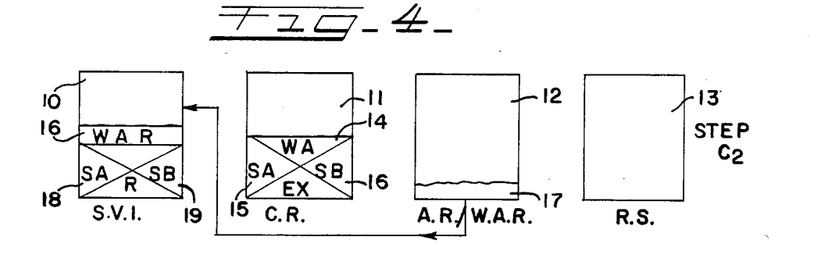

Referring to FIG. 2, the exhausted resin mixture comprising resins 14, 15 and 16 is transferred from S.V.1 10 to the C. R. vessel 11 in step B of the procedure. At the termination of this step, S.V.1 10 is empty. In FIG. 3, the regenerated mixed resin comprising resins 18 and 19 is subsequently transferred from the resin storage (R.S.) vessel 13 to the S.V.1 10 in step C1. At the termination of step C1, the R.S. vessel 13 is empty. In step C2, shown in FIG. 4, the regenerated weakly acidic resin 17 is transferred from the A.R./W.A.R. vessel 12 to S.V.1 10, and in doing so forms a layer above the mixed resins 18 and 19. At the termination of this step, the A.R./W.A.R. 12 and R.S. 13 vessels are empty.

Figure 5:
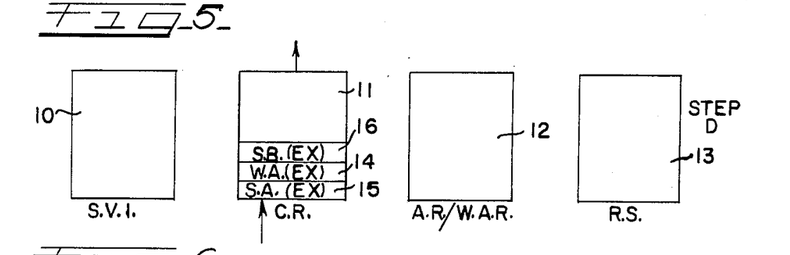

In step D shown in FIG. 5, the exhausted resin mixture comprising 14, 15 and 16 contained in the C.R. vessel 11 are hydraulically classified by passing a liquid upwardly through the resins. In usual practice, this liquid is water, and is delivered upwardly through the resins at a rate that is sufficient to classify or separate the resins into stratified layers by density as shown in FIG. 5 by resins 14, 15 and 16. The classified resins are shown in a stratified condition in FIG. 5 with the least dense exhausted strongly basic anion exchange resin 16 on top, the exhausted weakly acidic cation resin 14 as an intermediate interface and the exhausted strongly acidic cation exchange resin 15 forming the lowermost layer in the vessel.

Figure 6:
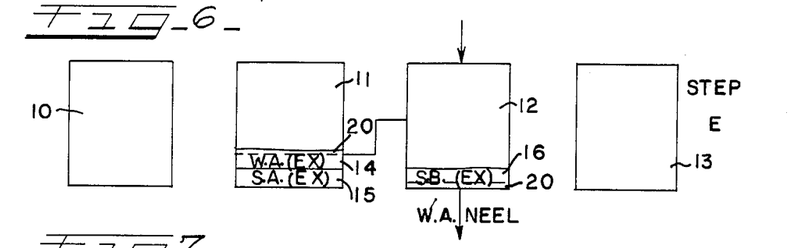

Subsequent to the stratification step D, the resins are isolated from one another (see FIG. 6). In a preferred embodiment, the isolation is accomplished by transferring the exhausted strongly basic anion exchange resin, S.B.(ex) 16 to the A.R./W.A.R. vessel 12 by means of a transfer pipe located at the interface of S.B.(ex) 16 and the W.A.(ex) 14. In the transfer is included a cut or fraction comprising resin that is rich in S.B.(ex) contaminated with a small quantity of W.A.(ex) 14. This carry-over of W.A. (ex) 14 is referred to herein as W.A. Heel 20.

The exhausted strongly basic anion exchange resin, S.B.(R) 16 is subsequently regenerated in the A.R./W.A.R. vessel 12 and is separated from the W.A. Heel 20 by the method described in the Salem patent referred to above. At the end of the Salem treatment process, the W.A. Heel is in a sodium ion form as indicated by numeral 21 in FIG. 7, step F. The strongly basic resin S.B.(ex) is shown by numeral 22 in FIG. 7 following its transfer to the R.S. vessel 13, and the W.A. Heel in the sodium ion form 21 remains in the A.R./W.A.R. vessel 12, having been purged and rinsed of caustic (sodium hydroxide).

Figure 8:
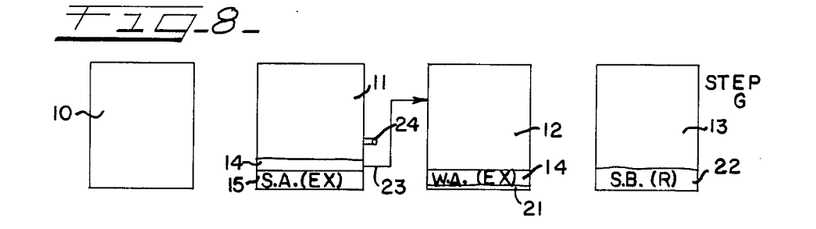

Referring to FIG. 8, the W.A.(ex) 16 is transferred from the C.R. vessel 11 to the A.R./W.A.R. vessel 12 by means of an outlet nozzle indicated by numeral 23 in FIG. 8. The outlet nozzle 23 is located in the side wall of the C.R. vessel 11 at an appropriate level below the anion exchange resin outlet nozzle shown as numeral 24 used in step E. At the completion of this step, the W.A. Heel in the sodium ion form 21 and the W.A. (ex) 16 are located in the A.R./W.A.R. vessel 12, and only the S.A.(ex) 15 remains in the C.R. vessel 11.

Figure 9:
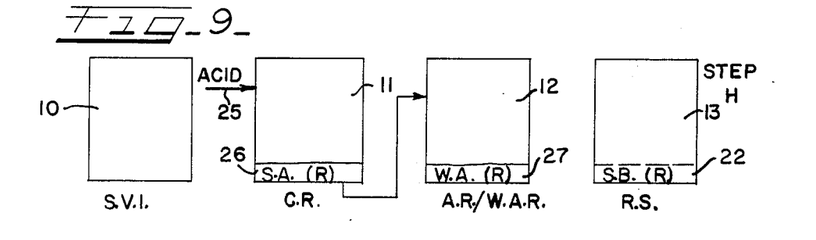

The strongly acidic cation exchange resin S.A.(ex) 15 in the C.R. vessel 11 and the weakly acidic cation exchange resins W.A.(ex) 16 and W.A. Heel 21 contained in the A.R./W.A.R. vessel 12 are regenerated with an acidic treatment conducted in series as shown in FIG. 9, step H. The acid is first introduced through the inlet porthole shown by numeral 25 into the C.R. vessel 11. The acid is then passed through the strongly acidic cation exchange resin S.A. shown by numeral 26 and then through the weakly acidic cation exchange resin indicated by numeral 27 located in A.R./W.A.R. vessel 12.

For purposes of illustration, the suitable regenerant indicated in step H of FIG. 9 is sulfuric acid. As those skilled in the art will realize, however, other suitable regenerants may be employed and the particular regenerant used forms no part of the present invention.

During the regeneration step, ammonia which is adsorbed on the exhausted weakly acidic cation exchange resin W.A.(ex) 16 and the sodium ions adsorbed on the weakly acidic cation exchange resin Heel 21 from FIG. 8 step G are stripped off by the "waste" acid which has passed through the strongly acidic cation exchange resin bed in step H of FIG. 9. At the end of this step the C.R. vessel 11 contains regenerated strongly acidic cation exchange resin S.A. shown by numeral 26, and the A.R./W.A.R. vessel 12 contains regenerated weakly acidic cation exchange resin W.A. shown by numeral 27 in FIG. 9.

Figure 7:
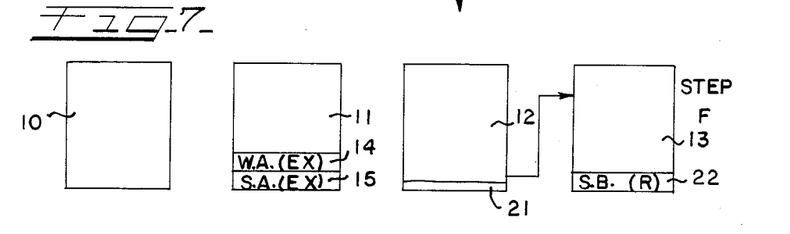

The regeneration step is followed by a rinsing step using methods that are familiar to those skilled in the art, and the strongly acidic cation exchange resin 26 is transferred to the R.S. vessel 13 shown in FIG. 7 for remixing with the strongly basic anion exchange resin S.B.(R) 22. Thus, at the completion of these steps, the weakly acidic cation exchange resin W.A. 27 resides in the A.R./W.A.R. vessel 12 as a regenerated weakly acidic cation exchange resin as shown in FIG. 1 step A by W.A. (R) 17; and the regenerated, remixed strongly acidic cation and strongly basic anion exchange resins reside in the R.S. vessel 13 as indicated in FIG. 1 for S.A.(R) 18 and S.B.(R) 19. At this point, the process is complete and regeneration of the next service vessel charge can commence according to step A in FIG. 1 except that the S.V.1 is now S.V.2.

The manner of transferring resins between zones in the foregoing descriptions is familiar to those skilled in the art and any conventional method can be employed. For example, transfers by water pressure, air pressure or combinations thereof are acceptable.

In the event that regeneration of the weakly acidic cation exchange resin W.A.(ex) 14 in FIG. 1 step A is desired, steps B, C1, C2, and D are followed as shown in FIGS. 2, 3, 4 and 5, respectively. Step E in FIG. 6 is followed except that the Salem regeneration treatment is omitted and the strongly basic anion exchange resin S.B.(ex) 16 is transferred immediately to a resin storage vessel. The procedure in step G of FIG. 8 is followed. The acid regeneration step shown in FIG. 9, step H is followed, giving the weakly acidic cation exchange resin W.A. 27 a "free ride". Alternatively, the acid treatment can be performed by bypassing the C.R. vessel 11 in FIG. 9 step H and introducing the acid directly to the A.R./W.A.R. vessel 12 to regenerate the weakly acidic cation exchange resin W.A. 27.

The density of the intermediate density liquid employed in the present invention depends upon the densities of the particular anion and cation exchange resins that are being employed. The only essential factor is that the density of the intermediate density liquid be between the densities of the anion and cation exchange resins. As a general matter, the intermediate density liquid should preferably have a specific gravity between about 1.088 and 1.17.

The method of the present invention can be adapted for use with a wide variety of anion exchange resins, strongly acidic cation exchange resins and weakly acidic cation exchange resins. The only requirement is that the resins differ in density. Typical solid strongly acidic cation exchange resins that can be used in the present invention are those of the styrene-divinylbenzene copolymer type, the acrylic type, the sulfonated coal type and the phenolic type. Typical solid strongly basic anion exchange resins that can be employed in the present invention are the phenol-formaldehyde type, the styrene-divinylbenzene type, the acrylic type and the epoxy type.

Typical solid weakly acidic cation exchange resins that can be employed in the present invention are carboxylic acid type having an ionization constant $pK_a$ less than about 5.8.

As previously discussed, a non-halogenated derivative of a carboxylic acid-type weakly acidic cation exchange resin usually exhibits a $pK_a$ greater than about 5.0. A halogenated derivative of a carboxylic acid-type weakly acidic cation exchange resin, on the other hand, exhibits a $pK_a$ greater than about 4.0. If weakly acidic cation exchange resins such as phosphonic and phosphonous acid resins are considered, the lower end of the $pK_a$ range would be about 3.5. Thus, the weakly acidic cation exchange resin should have $pK_a$ in the range of about 3.5 to about 5.8. The operating efficiency of the resin system is poor above or below that range of values.

The anion and cation exchange resins are preferably employed as beads in the size range of about 16–60 mesh. Suitable bead resins are commercially sold under the trademark Amberlite by Rohm & Haas Co., Duolite by Diamond Shamrock Chemical, and Dowex by Dow Chemical Co. Particularly suitable anion exchange resins are sold under the trademarks Amberlite IRA-900 and IRA-400, Duolite ES-109 and Dowex SBR. Particularly suitable strongly acid cation exchange resins are sold under the trademarks Amberlite IRA-200 and IRA-120, Duolite ES-26 and Dowex HCR-W and HGR-W2. Particularly suitable weakly acid cation exchange resins are sold under the trademarks Duolite C-464 and Dowex MWC-1.

The following example is intended to illustrate the separation and isolation process of the present invention, and should not be construed as limiting since the scope of the invention is determined with reference to the appended claims.

EXAMPLE 5

A service column forming part of a tri-media condensate treatment for a condensate power water recirculation system is charged with 50 cubic feet of anion exchange resin, 50 cubic feet of strongly acidic cation exchange resin and 50 cubic feet of weakly acidic cation exchange resin. After the resins are exhausted, they are transferred to a first separation vessel under the influence of both air and water pressure. The resins are separated in the separation vessel with an upflow of liquid delivered at a rate of about 4 gallons per minute per square foot of resin. This resin area is measured perpendicular to the flow of water.

Subsequent to the separation, the upper layer of anion exchange resin along with some contaminant weakly acidic cation exchange resin heel is transferred to a second separation vessel. This resin is cleaned by backwashing at a rate of about 4 gallons per minute per square foot. The water is then drained from the contaminant separation vessel.

A 15% solution of sodium hydroxide having a specific gravity of 1.16 at 120° F. is introduced into the second contaminant separation vessel. Sufficient solution is introduced to raise the bed level above its original position, and the drain is then opened while the remainder of the solution is introduced. The drain valve is regulated in order to maintain the bed above its original position. This causes a gap to be produced between the anion exchange resin and the cation exchange resin heel, which sinks to the bottom of the contaminant separation vessel.

The regenerated anion exchange resin is next transferred to a resin storage vessel. This transfer is accomplished through a pipe that communicates with the contaminant separation column at a level even with the gap produced by the sodium hydroxide solution between the anion exchange resin and the contaminant cation resin heel. Thus, all of the contaminant cation exchange resin that sinks to the bottom of the vessel is left behind. The anion exchange resin is transferred to a resin storage vessel and rinsed.

The cation resin heel in the second separation vessel is rinsed and purged of sodium hydroxide solution. The weakly acidic cation exchange resin from the bulk cation resin zone in the first separation zone is transferred to the second separation zone, and is mixed with the weakly acid cation heel. This is accomplished through a pipe that communicates with an outlet nozzle located at an appropriate point below the anion exchange resin outlet nozzle.

The strongly acidic and weakly acidic cation exchange resins are regenerated in series by delivering an aqueous solution of sulfuric acid, passing the acid through the cation resin zone in the first separation zone to provide waste acid and regenerated strongly acidic cation exchange resin, and subsequently passing the waste acid through the second separation zone. The weakly acidic cation exchange resin and cation heel in salt form are simultaneously regenerated to the acid form.

The regenerated strongly acidic cation exchange resin is rinsed and transferred to the resin storage (R.S.) vessel where it is mixed with the regenerated anion exchange resin. The mixed resins can then be transferred to a service vessel. The regenerated weakly acidic cation exchange resin is then added as a layer over the mixture of the anion exchange resin and the strongly acidic cation exchange resin to form the tri-media condensate treatment.

Conclusion

As described herein, a single bed ion exchange system including a weakly acidic cation exchange resin having a $pk_a$ less than about 5.8 (for example, Dowex MWC-1) substantially removes impurities including ammonia and metal ions from a solution under condensate polishing conditions. As also described herein, a mixed bed ion exchange system including a weakly acidic cation exchange resin as described above and a strongly basic anion exchange resin produces the same result under condensate polishing conditions. Accordingly, a tri-media resin system as disclosed herein also achieves that result. That result would not be expected by one of ordinary skill in the art of ion exchange.

As shown in Table 5 and as described in examples 2 and 3, ammonia added at a concentration of about 2 parts per million to the influent of the mixed bed was removed to concentrations in the effluent of less than 10 parts per billion. Sodium ions, introduced to the influent at concentrations from 50 to 550 parts per billion were reduced to concentrations from 0.5 to 1.0 parts per billion after passage through the mixed bed. This represents much better than ninety percent removal (in particular, about ninety-nine percent removal) of impurities from the influent. Those results were obtained for the described mixed bed system upon operation at temperatures from about 90° F. to 140° F. and at a flow rate of about 50 gallons per minute per square foot.

The quantity of acid required to regenerate the cation exchange resin of the mixed bed was reduced by a factor of 2-3 relative to the quantity of acid required to regenerate the cation exchange resin of a mixed bed comprising a mixture of strongly acidic cation and strongly basic anion exchange resins.

From the data presented above in section A of the detailed description of the invention, it will be apparent that operation of the service column under the above conditions will result in a minimal metal ion leakage and the run length of the tri-media resin bed will be increased relative to a mixed bed including only a strongly acidic cation exchange resin and a strongly basic anion exchange resin. Moreover, efficient separation and isolation of the resins comprising the tri-media resin bed can be achieved.

While the present invention has been described with reference to particular embodiments, it will be understood that various changes and modifications can be made without departing from the spirit thereof, particularly as defined in the following claims.

We claim:

1. A method for removing impurities including ammonia and sodium ions from a liquid comprising the steps of:
   (a) preparing a bed of filter materials including a first layer of a weakly acidic cation exchange resin and a second layer of a mixture comprising a strongly acidic cation exchange resin and an anion exchange resin, said weakly acidic cation exchange resin having a $pK_a$ in the range of about 3.5 to 5.8 and
   (b) passing the liquid through said first layer and then said second layer of said bed at a temperature less than 200° F. and at a flow rate of less than about 75 gallons per minute per square foot to substantially remove the impurities and purify the liquid.

2. The method according to claim 1 wherein the weakly acidic cation exchange resin is an acrylic acid-containing copolymer.

3. The method according to claim 1 wherein the liquid is passed through the bed at a temperature in the range of about 80° F. to 190° F.

4. The method according to claim 1 wherein the liquid is passed through the bed at a temperature in the range of about 115° F. to 140° F.

5. The method according to claim 1 wherein the liquid is passed through the bed at a flow rate in the range of about 25 to 50 gallons per minute per square foot.

6. The method according to claim 1 whereby the weakly and strongly acidic cation exchange resins are in the hydrogen form and the anion exchange resin is in the hydroxide form.

7. The method according to claim 1 wherein the impurities include volatile amines having $pK_b$ less than about 5.0.

8. The method according to claim 1 wherein, after the liquid is passed through the bed, the total concentration of sodium ion impurities remaining in the liquid is less than about 1 part per billion.

9. The method according to claim 1 whereby the filter materials are periodically regenerated including the step of separating said resins by passing a second liquid upwardly through said resins to position said anion exchange resin in an upper layer, said strongly acidic cation exchange resin in a lower layer and said weakly acidic cation exchange resin therebetween.

10. The method according to claim 9 further including the step of delivering an intermediate-density liquid having a density intermediate between the densities of said cation and anion exchange resins in an amount sufficient to cause said anion exchange resin to float and said contaminant cation exchange resin to sink, whereby the contaminant cation exchange resin is separated from said anion exchange resin and said anion exchange resin is regenerated.

11. The method according to claim 9 further including the steps of isolating said layers and passing an aqueous solution of a strong acid serially through the weakly and strongly acidic cation exchange resins to regenerate said resins.

12. A method for removing impurities including ammonia and sodium ions from a liquid comprising the steps of:
(a) preparing a mixed bed of filter materials including an anion exchange resin, a first cation exchange resin and a second cation exchange resin which is an acrylic acid-containing copolymer and has a $pK_a$ in the range of about 4.0 to 5.8; and
(b) passing the liquid through the bed at a temperature in the range of about 80° F. to 190° F. and at a flow rate in the range of about 25 to 50 gallons per minute per square foot to substantially remove the impurities and to purify the liquid.

13. The method according to claim 12 wherein the first and second cation exchange resins are in the hydrogen form and the anion exchange resin is in the hydroxide form.

14. The method according to claim 12 wherein the impurities include volatile amines having a $pK_b$ less than 5.0.

15. The method according to claim 12 wherein, after the liquid is passed through the bed, the total concentration of sodium ion impurities remaining in the liquid is less than about 1 part per billion.

16. The method according to claim 12 whereby the filter materials are periodically regenerated including the step of separating said resins by passing a second liquid upwardly through said resins to position said anion exchange resin in an upper layer, said first cation exchange resin in a lower layer and said second cation exchange resin therebetween.

17. The method according to claim 16 further including the step of delivering an intermediate-density liquid having a density intermediate between the densities of said cation and anion exchange resins in an amount sufficient to cause said anion exchange resin to float and said contaminant cation exchange resin to sink, whereby the contaminant cation exchange resin is separated from said anion exchange resin and said anion exchange resin is regenerated.

18. The method according to claim 16 further including the steps of isolating said layers and passing an aqueous solution of a strong acid through said first and second cation exchange resins to regenerate said resins.

* * * * *